(12) United States Patent
Kumar et al.

(10) Patent No.: US 9,547,096 B1
(45) Date of Patent: Jan. 17, 2017

(54) MONOTUBE SEISMIC CABLE

(71) Applicant: Sterlite Technologies Limited, Aurangabad (IN)

(72) Inventors: Sravan Kumar, Rangareddy (IN); Roshan Kumar, Khagaria (IN); Kishore Sahoo, Silvassa (IN); Liu Buyong, Nanjing (CN); Shivam Srivastava, Jabalpur (IN); Phill Coppin, Denbigh (GB)

(73) Assignee: STERLITE TECHNOLOGIES LIMITED, Aurangabad, MH (IN)

( * ) Notice: Subject to any disclaimer, the term of this patent is extended or adjusted under 35 U.S.C. 154(b) by 0 days.

(21) Appl. No.: 15/074,097

(22) Filed: Mar. 18, 2016

(30) Foreign Application Priority Data

Dec. 2, 2015 (IN) .......................... 4556/MUM/2015

(51) Int. Cl.
*G02B 6/44* (2006.01)
*G01V 1/22* (2006.01)

(52) U.S. Cl.
CPC .............. *G01V 1/226* (2013.01); *G02B 6/4433* (2013.01); *G02B 6/4436* (2013.01); *G02B 6/4482* (2013.01)

(58) Field of Classification Search
USPC ......................................................... 385/113
See application file for complete search history.

(56) References Cited

U.S. PATENT DOCUMENTS 6,459,837 B1 * 10/2002 Fitz ...................... G02B 6/4429
385/113

* cited by examiner

*Primary Examiner* — Eric Wong

(57) ABSTRACT

The present disclosure provides an optical fiber cable. The optical fiber cable includes a buffer tube substantially present along a longitudinal axis. Further, the optical fiber cable includes a first layer. The first layer surrounds the buffer tube. Furthermore, the optical fiber cable includes a second layer. The second layer surrounds the first layer. Moreover, the optical fiber cable includes one or more strength members embedded inside the second layer. Further, the buffer tube encloses a plurality of optical fibers. Moreover, each of the plurality of optical fibers is color coded from a set of standard fiber colors and wherein the set of standard fiber colors comprises twelve colors. The first layer and the second layer provide a kink resistance, a crush resistance and flexibility to the optical fiber cable. Each of the one or more strength members is coated with a layer of ethylene acrylic acid.

20 Claims, 2 Drawing Sheets

MONOTUBE SEISMIC CABLE

TECHNICAL FIELD

The present disclosure relates to the field of optical fiber cable and, in particular, relates to a re-deployable optical fiber cable for sensing applications in a seismic activity area. The present application is based on, and claims priority from an Indian Application Number 4556/MUM/2015 filed on $2^{nd}$ Dec., 2015, the disclosure of which is hereby incorporated by reference.

BACKGROUND

In the recent years, optical fiber cables have pushed ahead the industrial sector globally by offering a variety of solutions for enabling a reliable, efficient, lighter, faster and cost effective management of resources. Moreover, the variety of solutions involve a faster telecommunication service, a precise sensing of defects, a medical surgical operation, structural studies in civil engineering, imaging applications, nuclear power research and the like. One of the prime industries which utilize the optical fiber cable is exploration and production industry. The exploration and production industry focuses on exploring and extracting various natural resources including oil, gas, petroleum and the like.

Moreover, the numerous operations in the exploration and production industry critically rely on usage of drilling machines, boring machines, pumping machines, excavators, cranes and trucks due to their nature of the operations. There is a consistent need for continuous monitoring and sensing of various seismic activities taking place in area of operations of the exploration and production industry. Traditionally, the sensing and monitoring is performed by utilizing various sensing applications. The sensing applications employ various sensing systems. This is achieved by installing optical fiber cable across the seismic activity area. An array of acoustic sensors is installed along the length of the optical fiber cables with a separation between each of the acoustic sensors. Furthermore, the acoustic sensors detect and analyze the acoustic waves generated in the optical fiber cable.

Moreover, the efficiency, grade and performance of the results obtained from the optical detectors and the array of acoustic sensors is based on a structure and materials used in manufacturing of the optical fiber cable. Further, the structure and the materials used affects weight, crush resistance, kink diameter, packing efficiency and cost of deploying optical fiber cable in the seismic activity area. Traditionally, the structure of the optical fiber cable is made of a number of layers housing a plurality of optical fibers. The number of layers includes a binder enclosing optical fibers, a buffer coating, strengthening fibers, a cable jacket and one or more strength members.

Several present systems are known in the art which provide the optical fiber cables employed in the exploration and production industry. For example, a dielectric optical fiber with reduced preferential bending is described in one of the prior arts. The optical fiber cable includes one or more tubes with each tube containing a number of optical fibers and a plastic jacket that encloses the tubes. A pair of diametrically opposed rods is partially embedded in the polyethylene jacket. The rods are made from continuous-filament glass fibers embedded in epoxy. The optical fiber cable uses a buffer tube with thixotropic gel filled inside.

Moreover, an optical fiber cable with an interlocking stitch binder is described in another prior art. The optical fiber cable includes a plurality of fibers, binders, a water blocking material and a jacket surrounding the tubes. The binder provides an interlocking stitch formed of one or more yarns to provide improved fiber unit identification. The binder in the above mentioned optical fiber cable is non-helically bounded. In addition, the optical fiber cable utilizes a water blocking material that evidently increases the thickness of the optical fiber cable. In addition, the jacket material is made of poly vinyl chloride or polyethylene. The above mentioned optical fiber cable is inefficient for the seismic activity area.

Going further, the existing optical fiber cables available are inefficient and unreliable when employed in the exploration and production industry. Presently, the optical fiber cable utilizes a wet buffer tube that eventually restrains the acoustic waves required for the sensing applications.

In light of the above stated discussion, there is a need for an optical fiber cable that overcomes the above stated disadvantages.

SUMMARY

In an aspect, the present disclosure provides an optical fiber cable. The optical fiber cable includes a buffer tube substantially present along a longitudinal axis. Further, the optical fiber cable includes a first layer. The first layer surrounds the buffer tube. Furthermore, the optical fiber cable includes a second layer. The second layer surrounds the first layer. Moreover, the optical fiber cable includes one or more strength members embedded inside the second layer. Further, the buffer tube encloses a plurality of optical fibers. In addition, the buffer tube is dry and made of a low smoke zero halogen material. Moreover, each of the plurality of optical fibers is color coded from a set of standard fiber colors and wherein the set of standard fiber colors comprises twelve colors. The first layer and the second layer provide a kink resistance, a crush resistance and flexibility to the optical fiber cable. In addition, the second layer is made of a thermoplastic polyurethane material. Furthermore, each of the one or more strength members is made of fiber reinforced plastic. Each of the one or more strength members is coated with a layer of ethylene acrylic acid. The layer of ethylene acrylic acid prevents slipping of the one or more strength members from the second layer. The optical fiber cable has a cable weight of 52±5% kilogram/kilometer. Further, the optical fiber cable has a kink diameter of 25 millimeters and a crush resistance of 2000 Newton/10000 millimeter$^2$. In addition, the optical fiber cable has a packing density of 50 percent.

In an embodiment of the present disclosure, the optical fiber cable further includes a plurality of binders. The plurality of binders surrounds the plurality of optical fibers. Each of the plurality of binders is color coded for an ease in an identification of a corresponding fibers of the plurality of optical fibers. Each of the plurality of binders is a binder thread made of a material selected from a group comprising a polyester thread, an aramid yarn and a polypropylene binder.

In an embodiment of the present disclosure, each of the plurality of optical fibers is enclosed within the buffer tube.

In an embodiment of the present disclosure, each of the plurality of optical fibers is ring marked.

In an embodiment of the present disclosure, each bundle of optical fibers of the plurality of optical fibers includes 12 optical fibers.

In an embodiment of the present disclosure, the buffer tube has an inner diameter of 3.5±0.2 millimeters, an outer diameter of 4.4±0.2 millimeters and a thickness of 0.5±0.1 millimeters.

In an embodiment of the present disclosure, the second layer has a thickness of 1.4±0.1 millimeters.

In an embodiment of the present disclosure, the optical fiber cable has a cable diameter of 7.6±0.3 millimeters.

In another aspect, the present disclosure provides an optical fiber cable. The optical fiber cable includes a buffer tube substantially present along a longitudinal axis. Further, the optical fiber cable includes a plurality of binders. Furthermore, the optical fiber cable includes a first layer. The first layer surrounds the buffer tube. Moreover, the optical fiber cable includes a second layer. The second layer surrounds the first layer. In addition, the optical fiber cable includes one or more strength members embedded inside the second layer. Further, the buffer tube encloses a plurality of optical fibers. In addition, the buffer tube is dry and made of a low smoke zero halogen material. Moreover, each of the plurality of optical fibers is color coded from a set of standard fiber colors and wherein the set of standard fiber colors comprises twelve colors. The plurality of binders surrounds the plurality of optical fibers. Each of the plurality of binders is color coded for an ease in an identification of a corresponding fibers of the plurality of optical fibers. Each of the plurality of binders is a binder thread made of a material selected from a group comprising a polyester thread, an aramid yarn and a polypropylene binder. The first layer and the second layer provide a kink resistance, a crush resistance and flexibility to the optical fiber cable. In addition, the second layer is made of a thermoplastic polyurethane material. Furthermore, each of the one or more strength members is made of fiber reinforced plastic. Each of the one or more strength members is coated with a layer of ethylene acrylic acid. The layer of ethylene acrylic acid prevents slipping of the one or more strength members from the second layer. The optical fiber cable has a cable weight of 52±5% kilogram/kilometer. Further, the optical fiber cable has a kink diameter of 25 millimeters and a crush resistance of 2000 Newton/10000 millimeter$^2$. In addition, the optical fiber cable has a packing density of 50 percent.

In an embodiment of the present disclosure, each bundle of optical fibers of the plurality of optical fibers includes 12 optical fibers.

In an embodiment of the present disclosure, the buffer tube has an inner diameter of 3.5±0.2 millimeters, an outer diameter of 4.4±0.2 millimeters and a thickness of 0.5±0.1 millimeters.

In an embodiment of the present disclosure, the second layer has a thickness of 1.4±0.1 millimeters.

In an embodiment of the present disclosure, the optical fiber cable has a cable diameter of 7.6±0.3 millimeters.

In yet another aspect, the present disclosure provides an optical fiber cable. The optical fiber cable includes a buffer tube substantially present along a longitudinal axis. Further, the optical fiber cable includes a first layer. The first layer surrounds the buffer tube. Furthermore, the optical fiber cable includes a second layer. The second layer surrounds the first layer. Moreover, the optical fiber cable includes one or more strength members embedded inside the second layer. Further, the buffer tube encloses a plurality of optical fibers. In addition, the buffer tube is dry and made of a low smoke zero halogen material. The first layer and the second layer provide a kink resistance, a crush resistance and flexibility to the optical fiber cable. In addition, the second layer is made of a thermoplastic polyurethane material. Furthermore, each of the one or more strength members is coated with a layer of ethylene acrylic acid. The layer of ethylene acrylic acid prevents slipping of the one or more strength members from the second layer. The optical fiber cable has a cable weight of 52±5% kilogram/kilometer. Further, the optical fiber cable has a kink diameter of 25 millimeters and a crush resistance of 2000 Newton/10000 millimeter$^2$. In addition, the optical fiber cable has a packing density of 50 percent.

In an embodiment of the present disclosure, the optical fiber cable further includes a plurality of binders. The plurality of binders surrounds the plurality of optical fibers. Each of the plurality of binders is color coded for an ease in an identification of a corresponding fibers of the plurality of optical fibers. Each of the plurality of binders is a binder thread made of a material selected from a group comprising a polyester thread, an aramid yarn and a polypropylene binder.

In an embodiment of the present disclosure, each of the plurality of optical fibers is enclosed within the buffer tube.

In an embodiment of the present disclosure, each of the plurality of optical fibers is ring marked.

In an embodiment of the present disclosure, each of the plurality of optical fibers is color coded from a set of standard fiber colors. The set of standard fiber colors includes twelve colors.

In an embodiment of the present disclosure, each of the one or more strength members is made of fiber reinforced plastic.

In an embodiment of the present disclosure, each bundle of optical fibers of the plurality of optical fibers includes 12 optical fibers.

BRIEF DESCRIPTION OF FIGURES

Figure 1A:
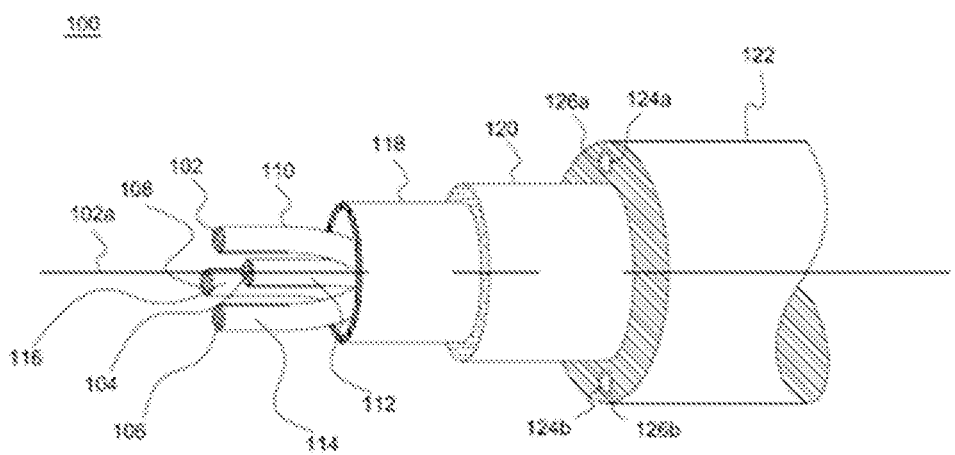
Figure 1B:
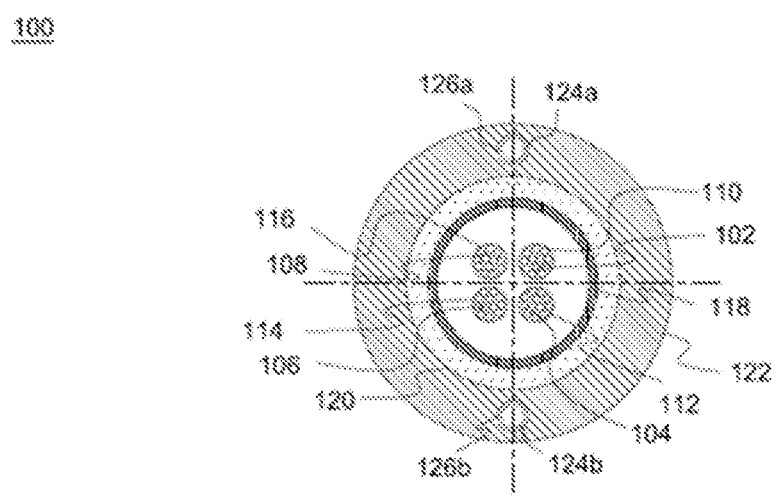

Having thus described the disclosure in general terms, reference will now be made to the accompanying figures, wherein:

FIG. 1A illustrates a perspective view of an optical fiber cable, in accordance with various embodiments of the present disclosure; and FIG. 1B illustrates a cross sectional view of the optical fiber cable of FIG. 1A, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, ranking, quantity, or importance, but rather are used to distinguish one element from another. Further, the terms "a" and "an" herein do not denote a limitation of quantity, but rather denote the presence of at least one of the referenced item.

FIG. 1 illustrates a perspective view of an optical fiber cable 100 for sensing applications in a seismic activity area, in accordance with various embodiments of the present disclosure. The sensing applications include detection of scaled temperature zones, scaled pressure or scaled vibration zones, leakages in pipelines, accidental fires and the like. Examples of the seismic activity area include but may not be limited to an oil well, a gas well, an onshore drilling area, an oil pipeline and a gas pipeline. Moreover, the optical fiber cable 100 is a re-deployable monotube seismic cable. The optical fiber cable 100 is designed to sustain damages with periodical changes in position of deployment in the seismic activity area. Further, the optical fiber cable 100 has a cable diameter. In an embodiment of the present disclosure, the cable diameter of the re-deployable optical fiber cable is 7.6±0.5 mm. In another embodiment of the present disclosure, the optical fiber cable 100 may have any suitable value.

Further, the optical fiber cable 100 includes a plurality of optical fibers 102-108 (as seen in FIG. 1A in conjunction with a cross-sectional view of the optical fiber cable 100 provided in FIG. 1B), a plurality of binders 110-116, a buffer tube 118, and a first layer 120, a second layer 122 and one or more strength members 124a-b. The above combination of materials and structure enables an improvement in a plurality of parameters of the optical fiber cable 100. The plurality of parameters includes a kink diameter, a crush resistance, a cable weight, a packing efficiency, and the like. Further, the optical fiber cable 100 is positioned symmetrically and substantially along a longitudinal axis 102a. The perspective view of the optical fiber cable 100 is a 3 dimensional view. The longitudinal axis 102a passes perpendicularly through a mid-point of the cross section of the optical fiber cable 100. The longitudinal axis 102a describes symmetry in a structure of the optical fiber cable 100.

The optical fiber cable 100 includes the plurality of optical fibers 102-108 substantially present parallel along the longitudinal axis 102a. In an embodiment of the present disclosure, the plurality of optical fibers 102-108 is arranged in bundles of optical fibers. In an embodiment of the present disclosure, the optical fiber cable 100 has four bundles of optical fibers. In another embodiment of the present disclosure, the optical fiber cable 100 has more than 4 bundles of optical fibers. Each bundle of the plurality of optical fibers 102-108 includes a pre-defined number of optical fibers. The pre-defined number of optical fibers depends on a scale of application and an area of the application of the optical fiber cable 100. In addition, the optical fiber cable 100 has a packing efficiency less than or equal to 50 percent owing to the pre-defined number of optical fibers in inside the buffer tube 118.

In an embodiment of the present disclosure, the 4 bundles of optical fibers include 48 optical fibers (each bundle having 12 or more optical fibers) for an optimized performance. In another embodiment of the present disclosure, the 4 bundles of optical fibers include 48 optical fibers (each bundle including less than 12 optical fibers) for the optimized performance. In addition, the optimized performance is derived in parlance of a structural design of the optical fiber cable 100, a material composition and the cable weight of the optical fiber cable 100.

In an embodiment of the present disclosure, the pre-defined number of optical fibers in each bundle of the plurality of optical fibers 102-108 is 12. In another embodiment of the present disclosure, the pre-defined number of optical fibers in each bundle of the plurality of optical fibers 102-108 is 24. In general, there are 12 standard colors of fibers. Each fiber of the plurality of optical fibers 102-108 may be marked with different combinations of marking. In addition, each fiber of the plurality of optical fibers 102-108 is marked for distinguishing fibers. Out of 24 fibers, 12 fibers are given 12 standard colors and remaining 12 fibers are single ring-marked. In yet another embodiment of the present disclosure, the pre-defined number of optical fibers in each bundle of the plurality of optical fibers 102-108 is 48. Moreover, out of 48 fibers, a first set of 12 fibers are colored with 12 standard colors and a second set of 12 fibers are colored and given a single ring-mark. In addition, a third set of 12 fibers are colored and given a double ring-mark and a fourth set of 12 are colored and given a triple ring-mark.

Furthermore, each optical fiber of the plurality of optical fibers 102-108 cables may be any type of fiber. In an embodiment of the present disclosure, each optical fiber in each bundle of the plurality of optical fibers 102-108 is a 250±5 μm optical fiber. In another embodiment of the present disclosure, each optical fiber in each bundle of the plurality of optical fibers 102-108 is a 200±5 μm fiber. In an embodiment of the present disclosure, each optical fiber in each bundle of the plurality of optical fibers 102-108 is a single mode fiber. In another embodiment of the present disclosure, each optical fiber in each bundle of the plurality of optical fibers 102-108 is a multi-mode fiber.

Each bundle of optical fibers of the plurality of optical fibers 102-108 is surrounded by a binder of the plurality of binders 110-116. In an embodiment of the present disclosure, the plurality of binders 110-116 is four or more. In another embodiment of the present disclosure, the optical fiber cable 100 has no binders. In addition, the plurality of binders 110-116 appears as binder threads around each of the plurality of optical fibers 102-108. Further, each of the plurality of binders is made of a material selected from a group comprising a polyester thread, an aramid yarn and a polypropylene binder. In addition, the plurality of binders 110-116 separates each bundle of the optical fibers for a protection and an identification of the optical fiber cable 100. In an embodiment of the present disclosure, each of the plurality of binders 110416 is color coded for an ease in an identification of a corresponding bundle of fibers of the plurality of optical fibers 102408. Each binder of the plurality of binders 110-116 possesses a different color. In addition, the different color helps in distinguishing each binder from another binder of the plurality of binders 110-116.

The buffer tube 118 is substantially present along the longitudinal axis 102a and encloses the plurality of optical fibers 102-108. The buffer tube 118 is designed to provide a kink resistance and flexibility to the optical fiber cable 100. The kink resistance is a parameter dependent on a scale of bending of the optical fiber cable 100. In general, the kink resistance is often measured in terms of bend radius or a kink diameter. The kink diameter or the bend radius allows more bending of each optical fiber in each bundle of the plurality of optical fibers 102-108 without sustaining any damage. The scale of bending of the optical fiber cable 100 in terms of the kink diameter is 25 millimeters. Further, the buffer tube 118 is dry and kink resistant. In general, the buffer tube 118 is dry owing to a requirement of free movement of optical fibers within the buffer tube 118 without sustaining friction. Moreover, the buffer tube 118 may be made of any suitable material. In an embodiment of the present disclosure, the buffer tube 118 is made of a low smoke zero halogen (hereinafter "LSZH") material. The LSZH material is a flaming retardant polyolefin material. The LSZH material includes polyolefin, ethyl vinyl acetate (hereinafter "EVA") and flame retardant fillers. Examples of the flame retardant fillers include but may not be limited to $Al(OH)_3$ and $Mg(OH)_2$. Moreover, the buffer tube 118 is halogen free and generates minimum smoke in flammable and heated environments. In addition, the buffer tube 118 has high melt strength and low melt flow index to facilitate application of the buffer tube 118 in manufacturing of the optical fiber cable 100. In addition, the dry buffer tube 118 is easy to process in manufacturing of the optical fiber cable 100.

In an embodiment of the present disclosure, the buffer tube 118 has an inner diameter of 3.5±0.2 millimeters, an outer diameter is 4.4±0.2 millimeters and a thickness of 0.5±0.1 millimeters. In another embodiment of the present disclosure, the buffer tube 118 may have any suitable inner diameter, the outer diameter and the thickness. The buffer tube 118 facilitates a free movement of each optical fiber in each bundle of the plurality of optical fibers 102-108 owing to the availability of the space inside the buffer tube 118. In addition, the buffer tube 118 optimizes the cable weight of the optical fiber cable 100. The buffer tube 118 meets an optimal requirement of mechanical properties to facilitate the free fiber movement.

The free movement of each optical fiber in each bundle of the plurality of optical fibers 102-108 present inside the buffer tube 118 increases return of each optical fiber to original position. Further, an array of acoustic sensor trays is installed in vicinity of the optical fiber cable 100 along the longitudinal axis 102a. Each sensor tray of the array of acoustic sensor trays is placed at a separation in a range of 10 meters-20 meters. The array of the acoustic sensor trays sense acoustic waves generated in the each optical fiber in each bundle of the plurality of optical fibers 102-108. Accordingly, the buffer tube 118 facilitates transfer of the acoustic waves without any restrain through the optical fiber cable 100.

Furthermore, the first layer 120 surrounds the buffer tube 118 to provide tensile strength. The first layer 120 facilitates optimization of the cable weight of the optical fiber cable 100. In an embodiment of the present disclosure, the cable weight of the optical fiber cable 100 is 52±5% kilograms/kilometer. In addition, the first layer 120 is made of an aramid yarn. The first layer 120 protects the buffer tube 118 in the optical fiber cable 100 against the crush resistance and kinks. Furthermore, the first layer 120 provides tensile strength along a length of the optical fiber cable 100 before and after deployment in the seismic activity area. The re-deployment requires multiple rolls of the optical fiber cable 100. Further, the first layer 120 bears the kinks and tensions generated from a plurality of rolls of the optical fiber cable 100 from a storage drum.

In addition, the first layer 120 has a first set of properties crucial for the protection of the optical fiber cable 100. The set of properties of the first layer 120 includes a resistance to abrasion, a resistance to organic solvent, non-conductivity and a minimum flammability. In addition, the set of properties includes integrity of fabric at elevated temperatures and sensitivity to acids and salts.

Furthermore, the second layer 122 surrounds the first layer 120. The first layer 120 and the second layer 122 provides the kink resistance, the crush resistance and flexibility to the optical fiber cable 100. In an embodiment of the present disclosure, the optical fiber cable 100 has the crush resistance of 2000 Newton per 10000 $millimeter^2$. In another embodiment of the present disclosure, the optical fiber cable 100 may have any suitable crush resistance. Moreover, the second layer 122 is designed to withstand the flammable and the heated environment of the seismic activity area. The second layer 122 is made up thermoplastic polyurethane (hereafter "TPU") jacket. The second layer 122 has a second set of properties crucial for the protection of the optical fiber cable 100 in the flammable and the heated environment of the seismic activity area. Furthermore, the second set of properties includes an abrasion resistance, a minimized-temperature operation, shear strength elasticity, an optimum level of transparency and oil and grease resistance. Further, the set of properties facilitate sustenance of the optical fiber cable 100 in the seismic activity area. In an embodiment of the present disclosure, the second layer 122 has a thickness of 1.4+−0.3 mm. In another embodiment of the present disclosure, the second layer 122 may have any suitable thickness.

In addition, the one or more strength members 124a-b are embedded inside the first layer 120 and positioned parallel along the longitudinal axis 102a of the optical fiber cable 100. Further, the one or more strength members 124a-b includes a first strength member 124a and a second strength member 124b. The second layer 122 may include more than 1 strength members along the longitudinal axis 102a of the optical fiber cable 100. In an embodiment of the present disclosure, each of the one or more strength members 124a-b is made of steel. In another embodiment of the present disclosure, each of the one or more strength members 124a-b is made of copper. In yet another embodiment of the present disclosure, each of the one or more strength members 124a-b is made of fiber reinforced plastic (hereafter "FRP"). In yet another embodiment of the present disclosure, each of the plurality of the strength members 124a-b is made of aramid fibers. In yet another embodiment of the present disclosure, each of the one or more strength members may be made of any other suitable metal or non-metal. The one or more strength members 124a-b is positioned to provide rigidity to the optical fiber cable and prevent the optical fiber cable from buckling.

Furthermore, each of the one or more strength members 124a-b is coated with a first layer of ethylene acrylic acid 126a and a second layer of ethylene acrylic acid 126b. The first layer of ethylene acrylic acid 126a and the second layer of ethylene acrylic acid 126b prevent slipping of each of the one or more strength members 124a-b.

It may be noted that in FIG. 1A and FIG. 1B, the one or more strength members 124a-b are embedded within the second layer 122; however, those skilled in the art would appreciate that more than 1 strength members are embedded in the second layer 122. In addition, it may be noted that in FIG. 1A and FIG. 1B, the one or more strength members 124a-b are embedded within the second layer 122; however, those skilled in the art would appreciate that the second layer 122 may have no strength members.

The present disclosure provides numerous advantages over the prior art. Further, the buffer tube used is halogen free based, dry and produces negligible amount of smoke. Further, the buffer tube provides the higher kink resistance or higher kink diameter of 25 mm. Moreover, the aramid yarn is significantly strong enough to handle the significant amount of the tensile loads, bends and stretches. Further, the aramid yarn provides thermal resistance to buffer tube during sheathing process. Furthermore, the second layer of TPU offers a robust resistance to chemicals, heat, oil and grease, tension, the crush and the kink resistance. Therefore, the optical fiber cable is designed with a combination of materials and structure to behave as a robust candidate for sensing applications in the seismic activity area.

The foregoing descriptions of pre-defined embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

What is claimed is:

1. An optical fiber cable comprising:
    a buffer tube substantially present along a longitudinal axis, wherein the buffer tube encloses a plurality of optical fibers, wherein the buffer tube is dry, wherein the buffer tube is made of a low smoke zero halogen material and wherein each of the plurality of optical fibers is color coded from a set of standard fiber colors and wherein the set of standard fiber colors comprises twelve colors;
    a first layer surrounding the buffer tube;
    a second layer surrounding the first layer, wherein the first layer and the second layer provide a kink resistance, a crush resistance and a flexibility to the optical fiber cable and wherein the second layer is made of a thermoplastic polyurethane material; and
    one or more strength members embedded inside the second layer, wherein each of the one or more strength members is made of fiber reinforced plastic, wherein each of the one or more strength members is coated with a layer of ethylene acrylic acid, wherein the layer of ethylene acrylic acid prevents slipping of the one or more strength members from the second layer, wherein the optical fiber cable has a cable weight of 52±5% kilogram/kilometer, wherein the optical fiber cable has a kink diameter of 25 millimeters, wherein the optical fiber cable has a crush resistance of 2000 Newton/ 10000 millimeter$^2$ and wherein the optical fiber cable has a packing density of 50 percent.

2. The optical fiber cable as recited in claim 1, further comprising a plurality of binders surrounding the plurality of optical fibers, wherein each of the plurality of binders is color coded for an ease in an identification of a corresponding fibers of the plurality of optical fibers, wherein each of the plurality of binders is a binder thread and wherein each of the plurality of binders is made of a material selected from a group consisting of a polyester thread, an aramid yarn and a polypropylene binder.

3. The optical fiber cable as recited in claim 1, wherein each of the plurality of optical fibers is enclosed within the buffer tube.

4. The optical fiber cable as recited in claim 1, wherein each of the plurality of fibers is ring marked.

5. The optical fiber cable as recited in claim 1, wherein each bundle of optical fibers of the plurality of optical fibers comprises 12 optical fibers.

6. The optical fiber cable as recited in claim 1, wherein the buffer tube has an inner diameter of 3.5±0.2 millimeters, an outer diameter of 4.4±0.2 millimeters and a thickness of 0.5±0.1 millimeters.

7. The optical fiber cable as recited in claim 1, wherein the second layer has a thickness of 1.4±0.1 millimeters.

8. The optical fiber cable as recited in claim 1, wherein the optical fiber cable has a cable diameter of 7.6±0.3 millimeters.

9. An optical fiber cable comprising:
    a buffer tube substantially present along a longitudinal axis, wherein the buffer tube encloses a plurality of optical fibers, wherein the buffer tube is dry, wherein the buffer tube is made of a low smoke zero halogen material and wherein each of the plurality of optical fibers is color coded from a set of standard fiber colors and wherein the set of standard fiber colors comprises twelve colors;
    a plurality of binders surrounding the plurality of optical fibers, Wherein each of the plurality of binders is color coded for an ease in an identification of a corresponding fibers of the plurality of optical fibers, wherein each of the plurality of binders is a binder thread and wherein each of the plurality of binders is made of a material selected from a group consisting of a polyester thread, an aramid yarn and a polypropylene binder;
    a first layer surrounding the buffer tube;
    a second layer surrounding the first layer, wherein the first layer and the second layer provide a kink resistance, a crush resistance and a flexibility to the optical fiber cable and wherein the second layer is made of a thermoplastic polyurethane material; and
    one or more strength members embedded inside the second layer, wherein each of the one or more strength members is made of fiber reinforced plastic, wherein each of the one or more strength members is coated with a layer of ethylene acrylic acid, wherein the layer of ethylene acrylic acid prevents slipping of the one or more strength members from the second layer, wherein the optical fiber cable has a cable weight of 52±5% kilogram/kilometer, wherein the optical fiber cable has a kink diameter of 25 millimeters, wherein the optical fiber cable has a crush resistance of 2000 Newton/ 10000 millimeter2 and wherein the optical fiber cable has a packing density of 50 percent.

10. The optical fiber cable as recited in claim 9, wherein each bundle of optical fibers of the plurality of optical fibers comprises 12 optical fibers.

11. The optical fiber cable as recited in claim 9, wherein the buffer tube has an inner diameter of 3.5±0.2 millimeters, an outer diameter of 4.4±0.2 millimeters and a thickness of 0.5±0.1 millimeters.

12. The optical fiber cable as recited in claim 9, wherein the optical fiber cable has a cable diameter of 7.6±0.3 millimeters.

13. The optical fiber cable as recited in claim 9, wherein the second layer has a thickness of 1.4±0.1 millimeters.

14. An optical fiber cable comprising:
    a buffer tube substantially present along a longitudinal axis, wherein the buffer tube encloses a plurality of optical fibers, wherein the buffer tube is dry and wherein the buffer tube is made of a low smoke zero halogen material;
    a first layer surrounding the buffer tube;
    a second layer surrounding the first layer, wherein the first layer and the second layer provide a kink resistance, a crush resistance and a flexibility to the optical fiber cable and wherein the second layer is made of a thermoplastic polyurethane material; and one or more strength members embedded inside the second layer, wherein each of the one or more strength members is coated with a layer of ethylene acrylic acid, wherein the layer of ethylene acrylic acid prevents slipping of the one or more strength members from the second layer, wherein the optical fiber cable has a cable weight of 52±5% kilogram/kilometer, wherein the optical fiber cable has a kink diameter of 25 millimeters, wherein the optical fiber cable has a crush resistance of 2000 Newton/10000 millimeter$^2$ and wherein the optical fiber cable has a packing density of 50 percent.

15. The optical fiber cable as recited in claim 14, further comprising a plurality of binders surrounding the plurality of optical fibers, wherein each of the plurality of binders is color coded for an ease in an identification of a corresponding fibers of the plurality of optical fibers, wherein each of the plurality of binders is a binder thread and wherein each of the plurality of binders is made of a material selected from a group consisting of a polyester thread, an aramid yarn and a polypropylene binder.

16. The optical fiber cable as recited in claim 4, wherein each of the plurality of optical fibers is enclosed within the buffer tube.

17. The optical fiber cable as recited in claim 14, where n each of plurality of optical fibers is ring marked.

18. The optical fiber cable as recited in claim 14, wherein each of the plurality of optical fibers is color coded from a set of standard fiber colors and wherein the set of standard fiber colors comprises twelve colors.

19. The optical fiber cable as recited in claim 14, wherein each of the one or more strength members is made of fiber reinforced plastic.

20. The optical fiber cable as recited in claim 14, wherein each bundle of optical fibers of the plurality of optical fibers comprises 12 optical fibers.

\* \* \* \* \*